UNITED STATES PATENT OFFICE.

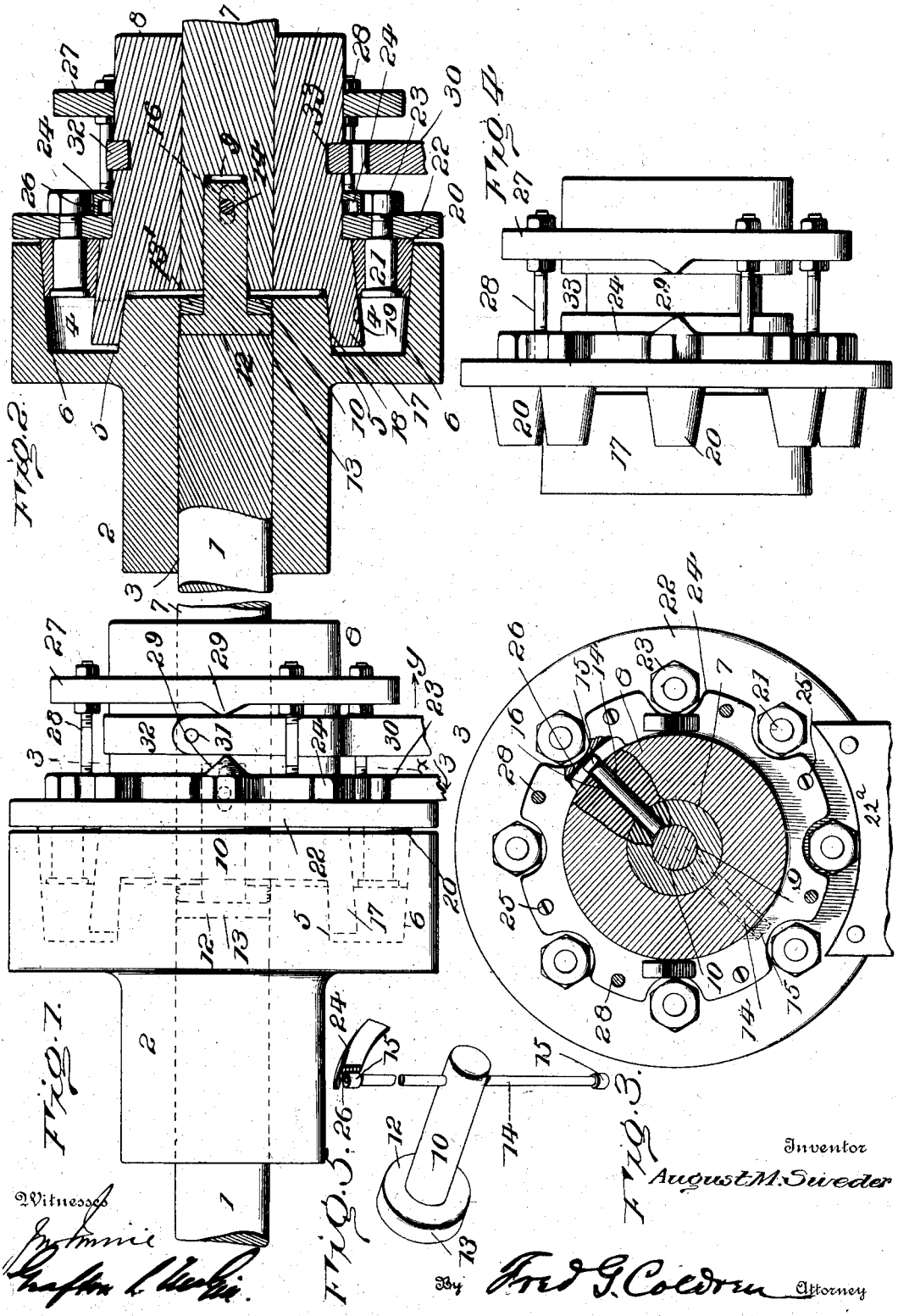

AUGUST M. SWEDER, OF MARQUETTE, MICHIGAN.

REVERSING-CLUTCH.

SPECIFICATION forming part of Letters Patent No. 706,479, dated August 5, 1902.

Application filed November 7, 1900. Renewed July 8, 1902. Serial No. 114,833. (No model.)

*To all whom it may concern:*

Be it known that I, AUGUST M. SWEDER, of Marquette, in the county of Marquette and State of Michigan, have invented certain new and useful Improvements in Reversing-Clutches; and I do hereby declare the following to be a full, clear, and exact description of the invention, such as will enable others skilled in the art to which it appertains to make and use the same.

This invention contemplates certain new and useful improvements in reversing-clutches.

The object of the invention is to provide improved, simple, and highly-efficient clutch mechanism whereby a driven shaft may be operated in the same direction as or in opposition to the rotation of the driving-shaft.

In a preferred form of embodiment the invention comprehends two coupling-heads, one on the driving-shaft and the other on a driven shaft, having tapered or inclined faces designed to be forced together when the driven shaft is to travel in the same direction as the driving-shaft and a series of tapered frictional rolls designed to be rotated by the coupling-head of the driving-shaft for rotating the driven shaft in opposite direction when the coupling-head of the latter is out of frictional engagement with the head of the driving-shaft.

The invention will be hereinafter fully set forth, and particularly pointed out in the claims.

In the accompanying drawings, Figure 1 is a view in side elevation. Fig. 2 is a vertical section view thereof. Fig. 3 is a transverse sectional view on line 3 3, Fig. 1. Fig. 4 is a view of the clutch with the driving-shaft and its coupling-head omitted. Fig. 5 is a view of the coupling.

Referring to the drawings, 1 designates the driving-shaft, and 2 a coupling-head fast thereon, formed with a central bore 3 and an annular groove or channel 4, the inner and outer walls 5 and 6 of which are tapered or beveled.

7 is the driven shaft, whereon is keyed a coupling-head 8, formed with a central bore to accommodate the shaft. The driven shaft has a central hole or bore 9 extending inwardly a short distance, wherein fits the stem 10 of a connection 12 in the form of a T-pin, the disk-like end or head 13 of which is held within the bore of coupling-head 2, adjacent to the end of the driving-shaft, by a threaded ring-washer 13'. Passing transversely through the stem 10 is a rod 14, on the ends of which are frictional rolls 15. This rod is projected through coincident slots 16 in the driven shaft and the hub of the coupling-head 8, said slots permitting the connection 12 to have a limited longitudinal movement in throwing in and out the clutching members. The coupling-head 8 is formed with a surrounding flange 17, the inner and outer walls 18 and 19 of which are tapered, that of the former corresponding to the taper of the inner wall 5 of the coupling-head 2, so that when the head 8 is forced into frictional engagement with the head 2 they will rotate in unison.

20 designates a series of tapered rolls journaled on headed studs 21, mounted in a stationary disk 22, and held by nuts 23 on the threaded ends of said studs, said rolls being located in the space between the tapered wall 6 of coupling-head 2 and the tapered wall 19 of the complementary head 8. When these walls are forced into frictional engagement against the wall 6 of head 2 and the head 8 is withdrawn from positive engagement with the head 2, said head 8 is forced to travel in opposite direction to the rotation of the driving-shaft. The disk 22, which may be held by any suitable means, such as a bracket 22ª, is loose on head 8, and to it a ring 24 is secured by screws 25, said ring having a counterbore 26, forming a raceway, in which the frictional rolls 15 are designed to travel. A second spaced-apart ring 27, loose on head 8, is held to ring 24 by nutted bolts 28, and to opposite points of these two rings on opposite sides of the driven shaft are secured (or they may be formed integral) V-shaped lugs 29, designed to take the force or power of a lever 30, fulcrumed at 31 to a collar 32, loosely fitted in a circular groove 33 in head 8.

In practice by throwing the lever 30 in the direction of the arrow *x* the coupling-head 8 and the driven shaft are slightly moved longitudinally away from head 2 and the friction-rolls 20 are thrown into engagement with the outer tapered wall 6 of the head of the driving-shaft. The rotation of these rolls by said head effects the rotation of the head of the driven shaft in the opposite direction, and the connection 12 between the two coupling-heads is acted upon, so that its disk-like end is forced into frictional engagement with the end of the driving-shaft; but by moving the lever in the direction of the arrow *y* the friction-rolls 20 are withdrawn from engagement with the tapered wall 6 and the tapered wall 18 of the coupling-head 8 is forced into frictional engagement with the tapered wall 5 of coupling-head 2, the disk-like end of the connection 12 being then held against the ring-washer 13'. The driven shaft is then rotated in the same direction as the driving-shaft. As the coupling-head 8 is rotated either to the right or to the left the rolls 15 on cross-rod 14 travel in the raceway formed by the ring 24. The T-pin forming the connection 12 between the two shafts always revolves in the direction of the driven shaft whether the motion is forward or reverse—that is, when the shaft is driven from right to left the T-pin moves in the same direction, and when the motion is reversed the pin is reversed also. When the driven shaft is reversed, there is a moment when the T-pin is stationary; but when the parts are locked the friction is between the head of the pin and the end of the driving-shaft. There is no friction between the head and the nut, the same being taken up by the rollers in the raceway.

The advantages of my invention are apparent to those skilled in the art. Although I have illustrated and described the preferred form of embodiment, it is obvious that changes in construction may be made without departing from the scope of my invention. It is also obvious that a clutch mechanism having the characteristics of my invention may be applied to innumerable uses.

I claim as my invention—

1. A clutch mechanism comprising a driving-shaft, a driven shaft, a coupling-head on each shaft, each head having two tapered walls, two corresponding walls of the two heads being designed to be thrown into frictional engagement, the other walls being oppositely tapered to form a surrounding V-space, a series of tapered frictional rolls located within such space and designed to be thrown into frictional engagement with the adjacent walls of said heads when the before-mentioned walls are out of engagement, and means for effecting said engagements, substantially as set forth.

2. A clutch mechanism comprising a driving-shaft, a driven shaft, a coupling-head fast on one shaft, a second coupling-head fast on the other shaft but capable, together with its shaft, of a limited longitudinal movement, a connection between said heads, each head having two tapered walls, two corresponding walls of the two heads being designed to be thrown into frictional engagement, a series of frictional rolls designed to be thrown into frictional engagement between the other walls of said heads when the before-mentioned walls are out of engagement, and means for effecting said engagements, substantially as set forth.

3. A clutch mechanism comprising a driving-shaft, a driven shaft, a coupling-head fast on the driving-shaft, a second coupling-head fast on the driven shaft which latter together with its coupling-head is formed with a longitudinal slot, a connection between said heads, a cross-rod carried by said connection extended through said slots, each of said heads having two tapered walls, two corresponding walls of the two heads being designed to be thrown into frictional engagement, a series of frictional rolls designed to be thrown into frictional engagement between the other walls of said heads, and means for effecting said engagements, substantially as set forth.

4. A clutch mechanism comprising a driving-shaft, a driven shaft, a coupling-head fast on each shaft, the coupling-head on the driven shaft together with the latter having coincident slots, a connection between said coupling-heads secured at one end within the head of the driving-shaft and extended into a bore in the driven shaft, a cross-rod carried by said connection extended through said slots, a raceway for said rod, each of said heads having two tapered walls, two corresponding walls being designed to be thrown into frictional engagement, a series of frictional rolls designed to be thrown into frictional engagement between the other walls of said head, and means for effecting said engagements, substantially as set forth.

5. A clutch mechanism comprising a driving-shaft, a driven shaft, a coupling-head fast on the driving-shaft, a coupling-head on the driven shaft having, together with the latter, coincident slots, a connection between said coupling-heads comprising a stem fitted in a bore of the driven shaft and a disk-like head, means for holding said disk-like head in the coupling-head of the driving-shaft, a cross-rod carried by said connection extended through said slots, rolls on the ends of said cross-rod, a raceway for said rolls, each of said heads having tapered walls, a series of frictional rolls, and means for effecting the driving of the driven shaft in the same or opposite direction as the driving-shaft, substantially as set forth.

6. The combination with the driving-shaft and a coupling-head fast thereon formed with inner and outer tapered walls, of a driven shaft having a hole or bore at one end, a coupling-head fast on said driven shaft which, together with the latter, has a longitudinal slot, a T connection having its disk-like head secured in the coupling-head of the driving-shaft and its stem fitted in the hole or bore of the driven shaft, a transverse rod carried by said stem extended through said slots, rolls on said rod, a disk, a series of frictional rolls carried by said disk located in the space between the outer tapered walls of the two coupling-heads, a ring secured to said disk and formed with a raceway for the rolls of the transverse rod, and means for simultaneously moving said series of frictional rolls and the coupling-head of the driven shaft in opposite directions, substantially as set forth.

7. The combination with the driving-shaft and the coupling-head fast thereon having an annular groove or channel formed with inner and outer tapered walls, of the driven shaft, a coupling-head fast thereon having inner and outer tapered walls, a connection between the two coupling-heads, a disk, a series of frictional rolls located in the space between the outer tapered walls of the two coupling-heads, studs for said rolls supported by said disk, two rings on the coupling-head of the driven shaft having opposite bearing-surfaces, a collar loose on said head, and an operating-lever fulcrumed to said collar and designed to engage said bearing-surfaces, substantially as set forth.

In testimony whereof I have signed this specification in the presence of two subscribing witnesses.

AUGUST M. SWEDER.

Witnesses:
GRAFTON L. MCGILL,
FRANK S. MAGUIRE.